United States Patent [19]

Shaffer

[11] 4,274,368
[45] Jun. 23, 1981

[54] TUNEABLE INTAKE MANIFOLD

[76] Inventor: Donald J. Shaffer, Box 88, Upper Strasburg, Pa. 17265

[21] Appl. No.: 150,364

[22] Filed: May 16, 1980

Related U.S. Application Data

[63] Continuation-in-part of Ser. No. 19,930, Mar. 12, 1979, Pat. No. 4,210,107, which is a continuation of Ser. No. 760,402, Jan. 18, 1977, abandoned.

[51] Int. Cl.³ .............................................. F02B 17/18
[52] U.S. Cl. ............................ 123/52 M; 123/52 MB; 123/52 MV
[58] Field of Search .......... 123/52 M, 52 MV, 52 MB, 123/52 MC

[56] References Cited

U.S. PATENT DOCUMENTS

| | | | |
|---|---|---|---|
| 1,893,502 | 1/1933 | Kuehn | 123/52 M |
| 2,806,457 | 9/1957 | Moseley | 123/52 MV |
| 2,835,235 | 5/1958 | Gassmann | 123/52 M |
| 2,947,293 | 8/1960 | Arkus-Duntov | 123/52 MV |
| 3,561,408 | 2/1971 | Weiand | 123/52 MV |
| 3,875,918 | 4/1975 | Loynd | 123/52 M |

FOREIGN PATENT DOCUMENTS

| | | | |
|---|---|---|---|
| 1009429 | 5/1957 | Fed. Rep. of Germany | 123/52 M |
| 2249733 | 4/1974 | Fed. Rep. of Germany | 123/52 MB |
| 769041 | 2/1957 | United Kingdom | 123/52 M |

Primary Examiner—Craig R. Feinberg
Attorney, Agent, or Firm—Thomas E. Beall, Jr.

[57] ABSTRACT

The runners of the intake manifold between the fuel-air mixture device and the valve ports of the head of an internal combustion enginer are tuneable to a particular engine speed range automatically by means of a pivotal mount for a wall portion of the runner in combination with a spring urging the runner wall portion towards the central axis of the runner to correspondingly decrease and increase the flow through cross sectional area along the runner in response to a decrease and increase, respectively, of the engine speed. The spring force may be separately adjustable.

9 Claims, 7 Drawing Figures

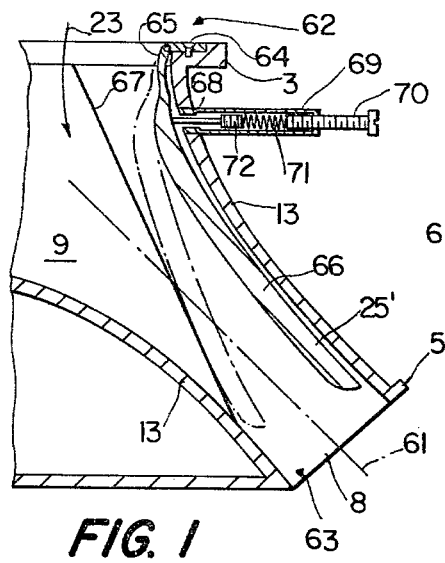
FIG. 1
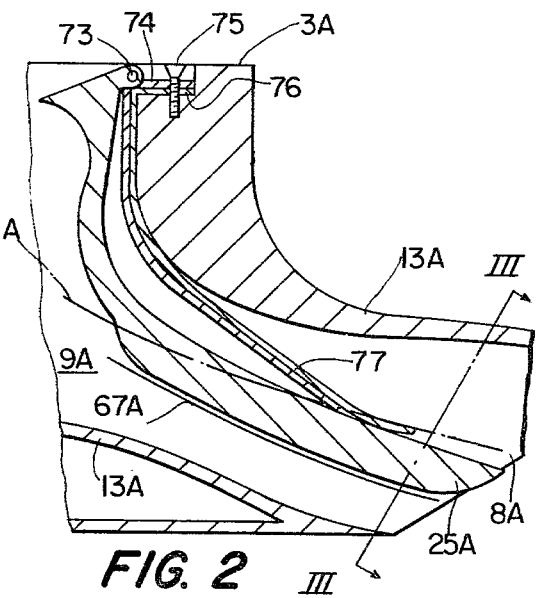
FIG. 2
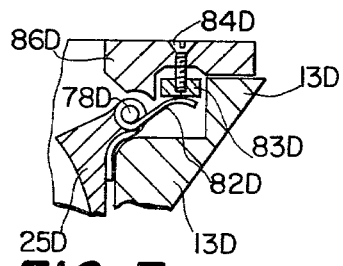
FIG. 7
FIG. 3
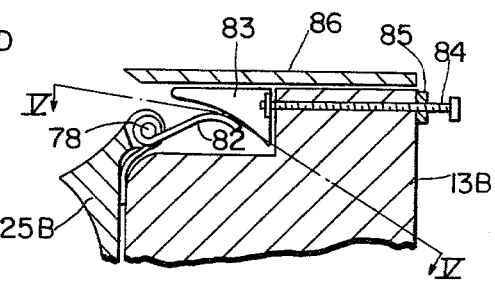
FIG. 4
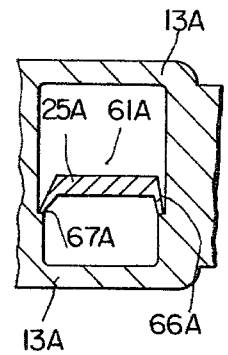
FIG. 5
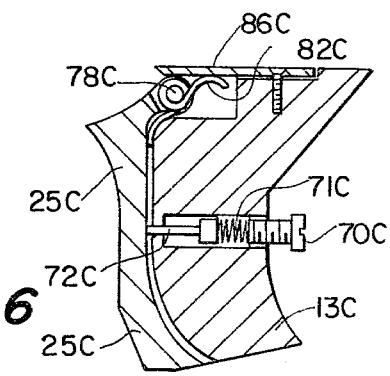
FIG. 6

TUNEABLE INTAKE MANIFOLD

BACKGROUND OF THE INVENTION

The present invention is a continuation-in-part of U.S. patent application Ser. No. 19,930, filed Mar. 12, 1979, now U.S. Pat. No. 4,210,107, in turn is a continuation of Ser. No. 760,402, filed Jan. 18, 1977, now abandoned of the same title.

It is known that the cross section and length of a runner has ideal dimensions with respect to a particular engine at a single engine speed, and variations of the engine speed from such fixed speed will reduce the efficiency of the runner. Therefore, with some engines, manifolds are sold separately for racing (tuned to a high engine speed) or for street use (tuned to a low engine speed), with such "tuning" being fixed and unchangeable. Therefore, to provide for a better efficiency at lower speed, with respect to a manifold set up for a higher speed, it is necessary to physically change the manifold, which is an expensive and time-consuming operation.

SUMMARY OF THE INVENTION

It is an object of the present invention to automatically change the cross sectional area of an intake runner of an intake manifold in response to changed engine speed, so as to increase the effective through flow cross sectional area with increased engine speed, in a simple and inexpensive manner, both with respect to initial construction and later maintenance.

BRIEF DESCRIPTION OF THE DRAWING

Further objects, features and advantages of the present invention will become more clear from the following detailed description of a preferred embodiment, as shown in the accompanying drawing, wherein:

FIG. 1 is a partial cross sectional view taken along the central axis of one runner of an internal combustion engine intake manifold;

FIG. 2 is a cross sectional view similar to FIG. 1, but of a second embodiment;

FIG. 3 is a cross sectional view taken along line III—III of FIG. 2;

FIG. 4 is a partial cross sectional view, similar to FIG. 1, but of a third embodiment;

FIG. 5 is a cross sectional view taken along line V—V of FIG. 4;

FIG. 6 is a cross sectional view similar to FIG. 1, but of a fourth embodiment; and FIG. 7 is a cross sectional view similar to FIG. 1, but of a fifth embodiment.

Applicant incorporates herein by reference all of the disclosure set forth in applicant's own commonly owned allowed patent application Ser. No. 19,930, filed Mar. 12, 1979. FIG. 1 of the present application corresponds to the right-hand portion of FIG. 2 of the above-mentioned allowed application, with common numbers being applied for common subject matter and with the movable wall being of a different construction according to the present invention. A perspective top view of the entire manifold of the present invention would appear exactly as shown in FIG. 1 of above-mentioned application Ser. No. 19,930. The embodiments of the present invention are alternatives to the embodiments of the above-mentioned application to solve similar problems and produce similar results, with differences as noted hereinafter.

In FIG. 1, one runner 13 of the manifold is provided with a carburetor mounting flange 3 and a head mounting flange 5, although the same may be used with respect to fuel injection. The plenum chamber 9, which is common to two or more, preferably four intake runners, guides the air 23 or the air-fuel mixture 23 into the runner 13. The runner has an axis of symmetry 61, which follows the general flow of fluid 23 and passes through the center of each cross section of runner interior that is taken on a plane perpendicular to the flow direction. The runner 13 and other structure forming the plenum 9 are impervious to the passage of fluid outwardly, except for the inlet opening 62 surrounded by the coupling flange 3 and the outlet opening 63 surrounded by the coupling flange 5. That is, the runner contains continuous impervious side walls. Adjacent one or more of the side walls, there is a movable side wall 25', which preferably is constructed of sheet metal of a bent configuration in a cross sectional view that would be the same as shown for movable wall 25A in FIG. 3, and further which could extend around a corner as shown with respect to movable wall 25B in FIG. 5, or be constructed of other material sufficient to withstand the environment. The movable wall 25' has an upper mounting portion 64 that is bent over and received within a corresponding cut-out portion of the flange 3, so that when a carburetor or the like is mounted on the flange 3, the portion 64 will be securely and fixedly clamped therein. This forms a hinge portion 65, which will permit the main portion of the movable wall 25 to move from its full line position to its dotted line position, without the main portion bending due to the flange like or bent edges that extend longitudinally along each side of the movable wall 25 in the direction of fluid flow, and which are similar to the bent edges 66A in FIG. 3. Two opposed side walls of the runner 13 are slotted at 67, in much the manner of the slotted side walls 67A in FIG. 3, so that a cross section taken perpendicular to the axis 61 in FIG. 1 would look substantially the same as the cross section in FIG. 3; this structure forms a stop limiting the movement of the movable wall to the extreme positions shown in dotted and full lines in FIG. 1.

The side wall of runner 13 is drilled and tapped at 68 for receiving a threaded sleeve 69, which alternatively could be welded to such drilled hole. In the outer end of the sleeve 69, there is threadably received an adjustment screw 70 to move in and out and accordingly change the compression of spring 71, which acts against movable piston 72, which in turn bears against an inner portion of the movable wall 25', to urge the movable wall 25' from its full line position towards its dotted line position.

The operation of the FIG. 1 embodiment is as follows. At low engine speeds, the movable wall 25 will be in the dotted line position to severely restrict or decrease the effective cross sectional area of the runner 13 that will permit the flow of fluid therethrough, namely that area to the left of the movable wall 25' in FIG. 1. In this manner, the size of the runner may be restricted to the efficient small size most desirable for such low speed. As the speed of the engine increases and the flow of fluid becomes greater, the movable wall 25 will progressively pivot about its hinge portion 65 towards the full line position and at maximum engine speed it will reach the full line position. The most efficient intermediate positions may be accurately set by adjustment of the screw 70 to adjust the spring bias.

Further embodiments of the present invention are shown in the remaining Figures. With respect to all of the embodiments, it is a part of the present invention that the springs may be interchangeable, the movable walls interchangeable, and the means for mounting the movable wall for movement interchangeable. For example, the movable wall of FIG. 2 could be mounted as shown in FIG. 1, spring tensioned and bias adjusted as shown in FIGS. 4 and 5, and further spring biased as shown by the supplemental spring of FIG. 6. The other combinations set forth above will not be discussed in detail.

With respect to the remaining embodiments, it is understood that all of the structure necessary for operation will be the same as in FIG. 1, except for the following specifically mentioned differences, with the common structure not being disclosed in detail.

In FIG. 2, the movable wall 25A employs an interleaved hinge structure with hinge pin 73 and hinge block 74, with hinge block 74 mounted by means of screw 75 in a recess in the side wall of the runner 13A. Instead of the spring mechanism 68–72 of FIG. 1, the embodiment of FIG. 2 employs a bimetallic spring, that has a bent portion 76 clamped by the screw 75 and a cantilevered leaf spring portion 77 that will bias the movable wall 25A into its illustrated innermost restrictive position. Against this spring bias, movable wall 25A may be pivoted counterclockwise from the position shown in FIG. 2 until it will be stopped by the adjacent uppermost wall of the runner 13A. The slots 67A will function in the same manner as the slots 67 described in FIG. 1, and otherwise the operation is the same as that of FIG. 1, except that the embodiment of FIG. 2 has a temperature compensation as a result of the bimetallic structure of the spring. That is, the spring characteristics will change with engine temperature to compensate for such factors as the change in density of the air in accordance with the change in temperature, so that accordingly the volume flow of fluid into the cylinders at a specific engine speed will change in accordance with temperature.

The embodiment of FIGS. 4 and 5 is substantially the same as the embodiment of FIG. 2, except that the hinge structure 73–75 is replaced by a single hinge, the leaf spring 77 is replaced by a coiled torsion spring and the temperature adjustment of the spring is replaced by a manual wedge adjustment, all to be described in more detail. The side walls of the runner 13B are drilled so as to receive, in a bearing fashion, the smooth bearing shaft portion of a hinge pin 78, which passes through a bearing portion 79 of the movable wall 25B. This bearing portion may be a circular bent sheet metal portion, if the movable wall 25B is constructed of sheet metal, or a drilled bore if the movable wall 25B is cast. The outer end of the pin 78 is of large diameter and threaded to be received in a similarly larger diameter and threaded portion of the bore within the runner wall at 80, so that the hinge pin may be secured by means of a suitable tool engaging head 81. As shown, a torsion spring is wrapped around the pin 78 to engage at one end the movable wall 25B and at its other end a fixed abutment, so as to bias the movable wall 25B towards its inner passage restricting position. The end of the spring 82 that is fixed is also adjusted in its fixed position by means of a wedge 83 moved toward and away from the spring 82 by means of an adjustment screw 84, with the locking mechanism 85. In this manner, the screw 84 may be moved in and out to accordingly increase and decrease, respectively, the spring bias for the same reasons that the adjustment mechanism 70 will increase and decrease the spring bias for the embodiment of FIG. 1.

The embodiment of FIG. 6 is the same as the embodiment of FIGS. 4 and 5, except that there is no spring tension adjustment device for the torsion spring 82C, and to provide for bias adjustment, there is a piston 72C that will engage the movable wall 25C under the bias of a compression spring 71C, whose compressive force is adjusted by means of the adjustment screw 70C, much in the same manner as the corresponding spring adjustment structure of FIG. 1, with which it is interchangeable. The embodiment of FIG. 6 could be varied by removing either the spring 82C or the spring mechanism 70C, 71C, 72C.

The embodiment of FIG. 7 is the same as the embodiment of FIG. 4, except that the spring adjustment mechanism 83–85 of the FIG. 4 embodiment is replaced by a spring adjustment mechanism employing a movable block 83D threadably secured on the end of an adjustment screw 84D, with the block 83D being held in a recess so it cannot rotate. Therefore, when the adjustment screw 84D is rotated, without moving axially, the block 83D will move axially either downwardly to increase the spring bias or upwardly to decrease the spring bias.

In the embodiments of FIGS. 4, 5, 6, and 7, there are suitable cover plates 86, 86C and 86D, respectively, to protect the spring and spring adjustment mechanisms from contamination.

All of the embodiments form passageways within their runners for a working fluid of an internal combustion engine, which passageways may be automatically varied in effective cross sectional area by one or more movable side walls that are biased towards the central axis of the runner so as to decrease the effective cross sectional area of the passage, and mounted for movement against the bias to automatically increase the effective cross sectional area of the passage with increased working fluid flow corresponding to increased engine speed. The adjusted positions are automatically maintained by means of abutments corresponding to a side wall of the runner itself or an internal stop such as slot 67 or 67A, spring tension that may be varied manually or automatically in response to temperature, the movable, particularly pivoted, connection of the movable side wall, and the inherent engine results of speed variation such as air flow.

Actual running tests were conducted for a test automobile, wherein the only variation between the tests was the type of manifold employed, with the following results.

EXAMPLE 1

Tests I–III were conducted with an Edelbrock Scorpion intake manifold on a 1956 4-door Chevrolet with a 336 cubic inch engine, forged TRW 11.0:1 pistons, 1971 LT-1 Corvette cam, Holley 780 cmf vacuum operated secondary carburetor, Saginaw wide ratio 4-speed 2.54:1 low gear transmission, 1964 Chevelle 3.36:1 rear gear, front tires 878-14, rear tires H70-14, fuel Sunoco 240. In Test I, the manifold employed was unmodified Edelbrock Scorpion, in Test II, the same manifold was modified according to the present invention, but the plates were locked in their position of maximum restriction, and in Test III, the plates of Test II were unlocked and fully operational with medium spring pressure.

With a hill climb test using low gear and a moving start from 800 to 4,000 rpm, the results were as follows: Test I, 3.85 seconds; Test II, 3.25 seconds; and Test III, 3.22 seconds. With the same hill and otherwise under the same conditions, but from a speed of 2,500–5,600 rpm, the results were: Test I, 3.10 seconds; Test II, 3.15 seconds; and Test III, 3.00 seconds. Since severe wheel spin was encountered during Tests II and III on the hill climb, the results would have been even more impressive for the present invention if the spinning could have been controlled.

The following experiments were conducted with respect to measuring the intake manifold pressure in inches of mercury, with the results that Tests II and III showed substantially the same pressures, which smoothly increased, from 1,300 rpm at 14 inches of mercury through 2,400 rpm at approximately 18.8 inches of mercury, whereas over the same range Test I showed pressures initially one inch lower and uniformly lower through one-half inch lower at the upper range. From 2,400 rpm through approximately 3,800 rpm, the inches of mercury continue to rise for each of Tests I through III, with the final pressure being approximately 18 for Test I, 18.7 for Test II, and 19.7 for Test III. Thereafter the pressure dropped for each of the Tests with Test I pressure at 5,600 rpm being about 16.4, Test II at 5,600 rpm being about 14.2, and Test II at 5,600 rpm being approximately 17.5.

Similar tests have confirmed these results that intake manifold vacuum is increased in all speed ranges, and power (hill climbing test) is improved when a comparison is made between a standard manifold and a manifold modified in accordance with the present invention.

EXAMPLE 2

A mileage test was conducted with a 1967 Chevelle Wagon having a 283 cubic inch engine with an automatic transmission and a 3.56:1 rear gear. The above-mentioned manifolds were employed for Test I, Test II, and Test III, with the following results: Test I, 19.9 mpg; Test II, 19.9 mpg; and Test III, 22.6 mpg. Driving conditions for the three tests were over the same course and maintained as close as possible.

While the present invention has been described with respect to various embodiments, with variations, for purposes of illustration and the importance of the details, further embodiments, variations and modifications are contemplated, all in accordance with the spirit and scope of the following claims.

What is claimed is:

1. An intake manifold for an internal combustion engine having an intake valve port, comprising:
   an air inlet coupling at one end of the manifold for connection to a source of at least air and an outlet coupling at an opposite end for connection directly to the intake valve port of the engine;
   at least one intake runner having opposite open ends, connected at one end to receive said air from said air inlet coupling and connected at its opposite end to said outlet coupling and thereby directly to said engine for conducting said air to the intake valve port of the engine;
   said intake runner being defined by and having side walls forming an inlet passageway having a central axis extending along the path of air flow through the passageway;
   at least one of said walls of said passageway being mounted via a mounting for movement towards and away from said central axis of said passageway to effectively decrease and increase the through flow cross sectional area as measured in a plane perpendicular to said axis throughout the length along said passageway, respectively, with said mounting including a pivotal connection, about a pivot axis generally perpendicular to the adjacent portion of said central axis and spaced therefrom for the end of said movable wall adjacent said air inlet coupling to said runner; and
   spring means biasing said movable wall about said pivot axis in the direction to decrease the through flow cross sectional area of the passageway for maintaining said movable wall in an adjusted position automatically in response to engine speed.

2. The intake manifold of claim 1, wherein said runner includes, in addition to said movable wall, a completely rigid tube surrounding said movable wall and being fluid impervious, said pivotal connection between said movable wall and runner generally preventing the passage of fluid between said movable wall and the portion of said tube on the opposite side of said movable wall from said passage, and said means for maintaining further including a positive stop abutment engaging said movable wall in a pivoted position of minimum passage through flow cross sectional area.

3. The intake manifold of claim 1, wherein said adjusting means is manually adjusted externally of said intake manifold with said manifold being operatively installed as a part of an operable internal combustion engine.

4. The intake manifold of claim 2, including a plurality of said intake runners rigidly connected together and further including a common plenum connected to said air inlet coupling.

5. The intake manifold of claim 2, wherein said spring means is a bimetallic leaf spring, so constructed that its spring bias acting on said movable wall automatically changes in accordance with temperature.

6. The intake manifold of claim 5, including a plurality of said intake runners rigidly connected together and further including a common plenum connected to said air inlet coupling.

7. The intake manifold of claim 2, further including means for manually adjusting the bias force of said spring means.

8. The intake manifold of claim 7, including a plurality of said intake runners rigidly connected together and further including a common plenum connected to said air inlet coupling.

9. The intake manifold of claim 8, wherein said adjusting means is manually adjusted externally of said intake manifold with said manifold being operatively installed as a part of an operable internal combustion engine.

* * * * *